United States Patent
Storm (10) Patent No.: US 9,988,835 B2
(45) Date of Patent: Jun. 5, 2018

(54) PROTECTION ARRANGEMENT FOR AN ELECTRIC VEHICLE

(71) Applicant: VOLVO TRUCK CORPORATION, Göteborg (SE)

(72) Inventor: Jonas Storm, Hisings Backa (SE)

(73) Assignee: Volvo Truck Corporation, Göteborg (SE)

( * ) Notice: Subject to any disclaimer, the term of this patent is extended or adjusted under 35 U.S.C. 154(b) by 92 days.

(21) Appl. No.: 14/898,320

(22) PCT Filed: Jun. 20, 2013

(86) PCT No.: PCT/EP2013/001883
§ 371 (c)(1),
(2) Date: Dec. 14, 2015

(87) PCT Pub. No.: WO2014/202103
PCT Pub. Date: Dec. 24, 2014

(65) Prior Publication Data
US 2016/0130851 A1 May 12, 2016

(51) Int. Cl.
*B60L 1/00* (2006.01)
*E05F 1/00* (2006.01)
(Continued)

(52) U.S. Cl.
CPC ............. *E05F 1/002* (2013.01); *B60L 3/00* (2013.01); *B60L 5/28* (2013.01); *B60L 5/42* (2013.01);
(Continued)

(58) Field of Classification Search
CPC ..... B60L 3/00; B60L 11/1816; Y02T 10/7005
(Continued)

(56) References Cited

U.S. PATENT DOCUMENTS 5,701,980 A * 12/1997 Lee ........................... B60L 1/04
191/4
2008/0096717 A1* 4/2008 Houle ..................... B60K 6/387
477/5
2008/0271173 A1 11/2008 Midrouillet et al.

FOREIGN PATENT DOCUMENTS

CN 1090538 A 8/1994
CN 101277838 A 10/2008
(Continued)

OTHER PUBLICATIONS

English machine translation provided for JP document JP2012-19591A.*
Chinese Official Action (dated Mar. 24, 2017) for corresponding Chinese App. 201380077585.0.
International Search Report (dated Feb. 20, 2014) for corresponding International App. PCT/EP2013/001883.
(Continued)

*Primary Examiner* — Alfonso Perez Borroto
(74) *Attorney, Agent, or Firm* — WRB-IP LLP (57) ABSTRACT

A protection arrangement for a current collector arranged on a vehicle having a rechargeable energy storage includes a first protective state in which the current collector is covered by the protection arrangement and a second open state in which the protection arrangement allows contact between the current collector and a corresponding current supply during charging of the energy storage and where the protection arrangement is automatically opened from the protective state to the open state when the vehicle has reached a predefined charging position. The current collector can be enclosed when the vehicle is not charged and the protection arrangement can open automatically when a charging position is reached. This can improve the safety of the vehicle and obviate the need of a specific circuit breaker that can disconnect the current collector from the electric energy storage. The charging of the vehicle can also be simplified.

18 Claims, 9 Drawing Sheets

(51) Int. Cl.
- *B60L 9/00* (2006.01)
- *B60L 11/18* (2006.01)
- *B60L 3/00* (2006.01)
- *B60L 5/28* (2006.01)
- *B60L 5/42* (2006.01)
- *B60M 1/36* (2006.01)
- *E05F 15/60* (2015.01)

(52) U.S. Cl.
CPC ............. *B60L 9/00* (2013.01); *B60L 11/1816* (2013.01); *B60L 11/1818* (2013.01); *B60L 11/1837* (2013.01); *B60M 1/36* (2013.01); *E05F 15/60* (2015.01); *B60L 2200/18* (2013.01); *E05Y 2900/53* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
USPC ................................................ 307/9.1; 49/31
See application file for complete search history.

(56) References Cited

FOREIGN PATENT DOCUMENTS

| | | |
|---|---|---|
| CN | 101580026 A | 11/2009 |
| CN | 102498011 A | 6/2012 |
| CN | 202608590 U | 12/2012 |
| EP | 1270313 A2 | 1/2003 |
| EP | 1371517 A1 | 12/2003 |
| JP | 201219591 * | 1/2012 |
| WO | 2010003021 A2 | 1/2010 |
| WO | 2010134763 A2 | 11/2010 |
| WO | 2012084095 A2 | 6/2012 |

OTHER PUBLICATIONS

International Preliminary Report on Patentability (dated Jun. 1, 2015) for corresponding International App. PCT/EP2013/001883.
Chinese Official Action (dated Jan. 10, 2018) for corresponding Chinese App. 201380077585.0.

* cited by examiner

PROTECTION ARRANGEMENT FOR AN ELECTRIC VEHICLE

BACKGROUND AND SUMMARY

The present invention relates to a protection arrangement for a current collector on an electric vehicle. The protection arrangement is suitable for electric vehicles and hybrid vehicles having a rechargeable battery.

The share of partly or only electrically driven vehicles is expected to increase radically in the next 10 to 20 years. Such vehicles are normally referred to as electric vehicles and hybrid vehicles. This also means a corresponding increase in the need to charge such vehicles. In principle, the charging is done by connecting the vehicle to the electrical network, either directly to one of the ordinary outlets used for other equipments, or through a special charger, external to the vehicle. Charging current is transferred from the network to a battery on board the vehicle.

The battery of the electric vehicle may either be charged with a relatively low current over a relatively long time period, e.g. over night. Such vehicles are referred to as plug-in vehicles and are common for hybrid vehicles which are provided with a battery having a relatively low capacity, such that the distance that the vehicle can travel on electric power is limited. When the battery is empty, or when additional power is required, the combustion engine is started. High current charging of plug-in vehicles is also possible. Since the vehicle is charged one or two times a day, a specific connector is used to connect the vehicle to the current source.

For vehicles that need to be charged several times a day, such as commercial vehicles, a connection by using a plug is not an efficient alternative. Instead, various types of current collectors are used, such as a moveable pantograph or a fixed current collector, where the corresponding current supply means is movable and contacts the fixed current collector. During charging, the current collector must of course be exposed to the corresponding current supply means in order to supply current to the battery. However, when the vehicle is driven or is not charging, the current collector should preferably be disconnected from the battery such that the battery voltage will not be present on the current collector. When the battery is disconnected from the current collector, it is safe for a service technician to work on or near the current collector. A further advantage of disconnecting the battery from the current collector is to prevent persons or objects to come in contact with the battery voltage, which is in the range of 300-600 volts or more.

One way of disconnecting the battery from the current collector is to use a power switch arranged between the battery and the current collector. Such a power switch must be able to break a short-circuit current between two current collectors connected to the battery poles for safety reasons. Such a switch is rather expensive.

Pantographs are known to be mounted on the roof of some rail vehicles to connect to an overhead conductor. In those cases, the return line is the rail. Pantographs may also be used by electric trolley buses. Such electric vehicles are constantly powered with electricity and do not have a chargeable battery as an additional power source. This means that the pantograph is not connected to any electric source when the pantograph is folded down, e.g. for service purposes. For a service technician, it is possible to work on the roof of such a vehicle without any specific safety arrangements.

U.S. Pat. No. 3,762,515 describes an apparatus for covering exposed, electrically conductive elements of a guideway following, electric vehicle. The brush assemblies of such a vehicle are covered by insulative shields when power is conducted to the elements from an external source and the vehicle is marshalling. In order for such a vehicle to be able to bridge different power circuits when e.g. passing a switch, the vehicle is provided with several brushes positioned at the front and at the rear of the vehicle. All brush assemblies are connected to each other and to the drive motor. Thus, when an external power source is connected to power the motor, the power is also applied to the brushes. The insulative shields covers the brushes outwards for preventing contact with the brushes by bystanders.

EP 1 270 313 A2 and EP 1 371 517 A1 discloses a protection shield for a current collector adapted to protect the current collector of a rail vehicle at a platform. The protection shield is arranged between the platform and the vehicle and prevents objects to touch the current collector from above.

These protection devices are all adapted for electric vehicles powered directly from an electricity network. They may work fine in some situations, but are not adapted for vehicles having a chargeable battery. Hence, there is room for improvements.

It is desirable to provide an improved protection arrangement for a current collector on an electric vehicle.

In a protection arrangement for a current collector arranged on a vehicle having an electric propulsion unit and a rechargeable electric energy storage, where the protection arrangement comprises a first protective state in which the current collector is covered by the protection arrangement and a second open state in which the protection arrangement allows contact between the current collector and a corresponding current supply means during charging of the energy storage, the protection arrangement is automatically opened from the protective state to the open state when the vehicle has reached a predefined charging position.

By this first embodiment of the protection arrangement for a current collector according to the invention, the protection arrangement will be opened automatically when the vehicle arrives at or has reached a charging position such that contact between the current collector and a corresponding current supply means is possible during charging of the electric energy storage of the vehicle. The rechargeable electric energy storage may be a battery or a super capacitor. When the electric energy storage is not charged, e.g. when the vehicle is not positioned at a charging station, the current collector will be covered by the protection arrangement. In this way, an accidental contact with the current collector by a service person will not be possible. It is of advantage that the protection arrangement is enclosed such that an operator can not touch the current collector. Preferably, the protection arrangement will stop an arm or a finger from passing through, and also a pointed object such as a screwdriver or the like such that maintenance can be performed close to the protection arrangement without the risk of touching the current collector. It is also an advantage to enclose the current collector in case of an accident, e.g. when the vehicle falls over on the side. The rescue party will be able to start working without the risk of touching the current collector and will not have to start by disabling the current collector before they can proceed. An enclosed current collector is also a security advantage should someone unauthorized climb up on the roof of the vehicle.

It is further advantageous to automatically open the protection arrangement when the vehicle reaches a predefined charging position. In this way, the current collector will be enclosed when the vehicle e.g. is travelling or is parked outside of the charging station. When the vehicle is at the charging station, in the predefined charging position, the protection arrangement can be opened automatically. The protection arrangement can e.g. be opened automatically when the vehicle enters a predefined charging area such that the protection arrangement is open when the vehicle stops at the charging position or when the vehicle has stopped at the charging position. The protection arrangement may e.g. be opened when an opening signal is issued. An opening signal may be issued separately or may be issued together with a charging signal.

The advantage of enclosing the current collector is that it is not necessary to use a disconnecting switch or circuit breaker between the electric energy storage and the current collector. A disconnecting switch is normally used to disconnect the current collector from the battery of a vehicle in order to make the current collector powerless. Due to the high voltage and the high current capacity of such a battery, there are rigorous safety regulations controlling how and when to perform service on the electrical system of such an electric vehicle. It may e.g. be prescribed that the current collector must have been disconnected for a certain amount of time before service work can start.

Further, a disconnecting switch that can handle the voltage and current of such a high voltage and high current battery is both heavy and expensive. The switch must not only be able to handle the current during normal use but also the short-circuit current in case of a shortcut between two adjacent current collectors. Thus, by removing the need of a disconnecting switch, a simple and cost-effective solution is obtained.

A further advantage is that the protection arrangement opens automatically when the vehicle is close to or at the charging position at the charging station. In this way, the charging process is simplified and the driver of the vehicle must not connect or disconnect the vehicle to and from the charging equipment. The protection arrangement may either open when the vehicle enters a predefined position, such as a charging zone, or when the vehicle is stopped at the predefined position and an opening signal is issued. The protection arrangement is further closed automatically when a closing signal is issued. The closing signal may be issued when the charging process is completed, when the vehicle starts moving, when the vehicle leaves the charging zone or when a person is in the vicinity of the current collectors.

The current collector may in one example be a pantograph that folds up to contact a conductor rail or conductor plate of some kind. Preferably, since the vehicle is a road vehicle provided with tires, there are two current collectors provided on the roof of the vehicle. When pantographs are used, they may be arranged either side by side or after each other in the driving direction of the vehicle. In either way, care must be taken when connecting the pantograph to the conductor rail such that each current collector contacts the corresponding conductor. With a pantograph, the protection arrangement is preferably a pivotable cover that opens upwards. The cover may e.g. be spring-loaded such that it is pushed open by the pantograph and swings back when the pantograph is retracted.

The protection arrangement is preferably opened automatically when a vehicle enters the charging zone in order to allow contact between the current collector and the corresponding current supply means. When the current collector is a fixed contact surface positioned on the roof, the cover may be opened by the corresponding current supply means that is movable in order to be able to contact the contact surface. The corresponding current supply means may be movable such that it can contact the current collector at the proper charging position, since it may be difficult to position the vehicle at the exact charging position by the driver. The cove may be a slidable cover that slides backwards when the vehicle enters the charging station or when an opening signal is issued. The cover may also be a dividable cover that is opened sideways when the vehicle enters the charging station or when an opening signal is issued.

The charging station is preferably a stationary charging station positioned e.g. at a terminus stop where the vehicle will wait until the next round trip starts. With a waiting time of e.g. 15 minutes, the battery may be charged enough when high-current charging is used. It is also possible to position a charging station at one or two intermediate stops along the trip in order to allow refresh charging. It is also possible to have a charging station at each stop which allows the electric energy storage to be charged enough to reach the next stop. In such a system, a relatively small battery or super capacitor may be used.

The cover may be opened by a pushing means arranged on the current supply means. Such a solution can be used when the vehicle enters the charging station such that the cover is opened at the same time as the current supply means approaches the contact surface. The cover may also be opened by an actuator when an opening signal is issued. Preferably, the cover is spring-loaded towards a closed state such that the cover is opened by the pushing means or the actuator and is released to the closed state by a release catch or the like. The actuator may be an electric means or a compressed air means, such as an electromagnetic actuator or an air actuated valve.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the claims.

Figure 1A:
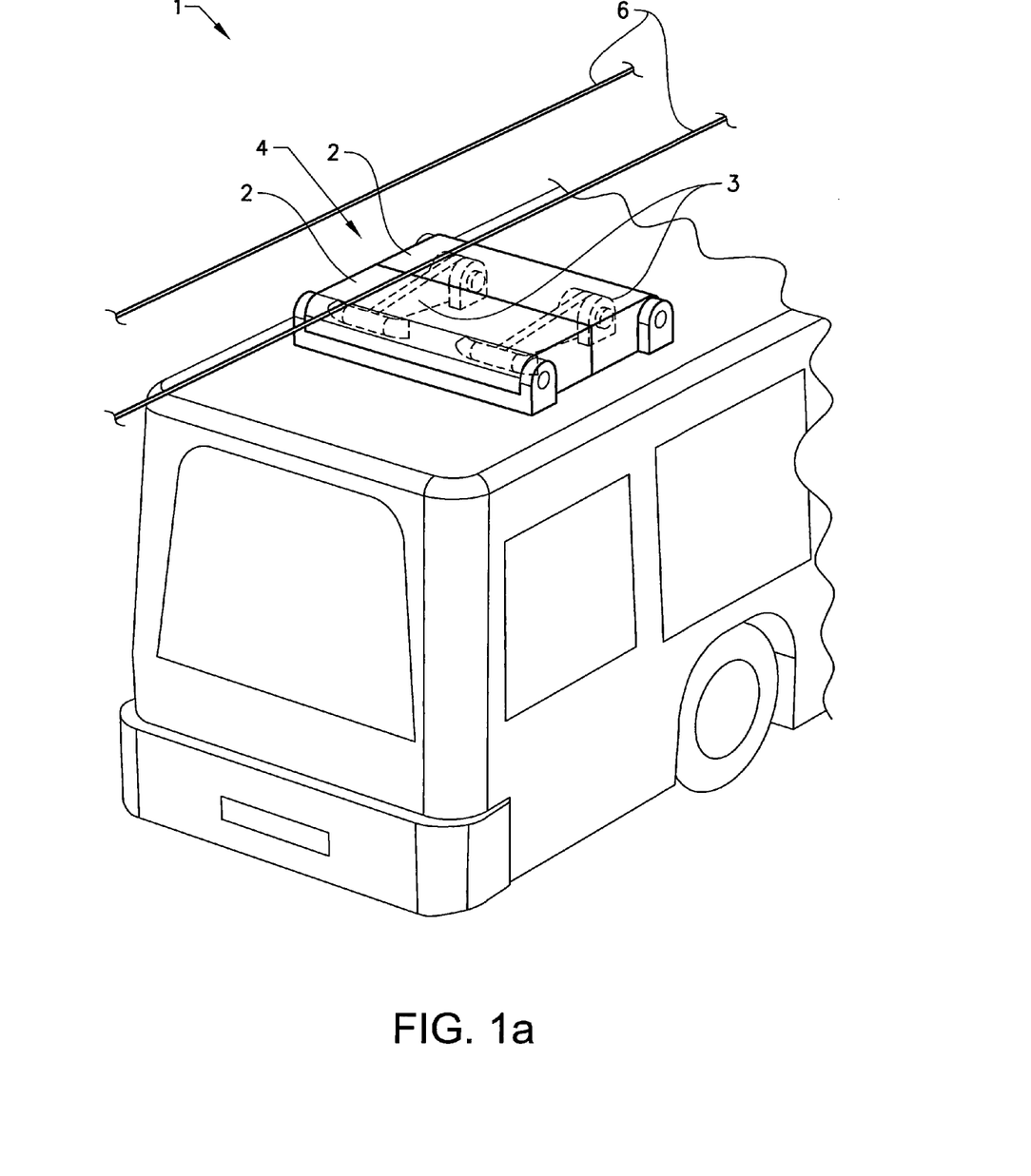
FIG. 1a shows a schematic first embodiment of a protection arrangement according to the invention in a closed state.
Figure 1B:
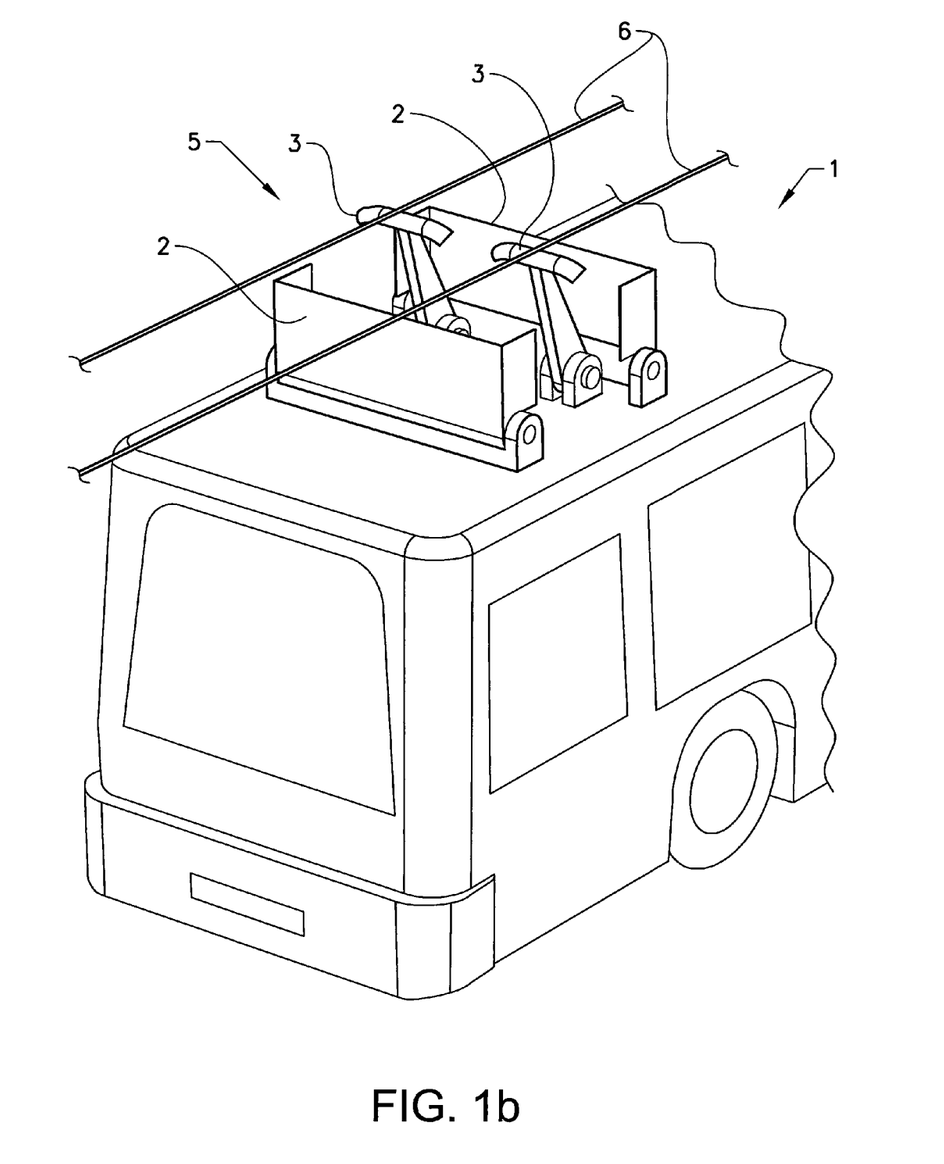
FIG. 1b shows a schematic first embodiment of a protection arrangement according to the invention in an open state.

FIGS. 1a and b shows a schematic first embodiment of a protection arrangement for a current collector according to the invention. In this embodiment, the current collector 3 is a pantograph and the protection arrangement 1 comprises two pivotable covers 2. The pantograph is used to connect an external current source to a rechargeable energy source, such as a battery or super capacitor, installed in the electric vehicle. The pantograph is preferably mounted on the roof of the vehicle, but it would also be possible to mount it under the vehicle such that it folds down towards a conductor rail below the vehicle. In the shown example, the pantograph folds up towards a conductor line 6 or conductor surface positioned above the vehicle, somewhat similar to the pantograph used by trams or trains. However, the mechanical design is less demanding since the pantograph will only be used for charging the vehicle battery when the vehicle is stationary, i.e. when the vehicle stands still at the charging station. Preferably, two pantographs are mounted side by side or after each other on the roof in order to provide two poles for the connection. It would also be possible to provide a return line, e.g. a ground connection, at a different location but two pantographs mounted on the roof simplifies the system and enables a safe charging of the battery. The pantographs may be mounted under the same protection arrangement using the same covers or each pantograph may have a separate cover. The pivotable covers 2 are preferably pushed open by the same action that pushes up the pantograph. It is preferred that the pantograph is pushed up by an active means, such as an electric actuator, and that the pantograph is spring-loaded such that it folds down automatically when e.g. the power to the electric actuator is disconnected.

The covers in the shown example are operated by the same mechanism that operates the pantographs. The covers are opened by an opening signal which is e.g. issued when the vehicle is close to or positioned at the charging position. The covers are preferably spring-loaded such that they close when the pantograph folds down. The covers may comprise a spring in the pivot or may use an external spring. With the use of pantographs, the charging position may vary some in a sideway direction. In this way, it is possible for the driver of the vehicle to position the vehicle in the charging position such that the contact surfaces of the pantograph can contact the conductor lines.

Figure 2A:
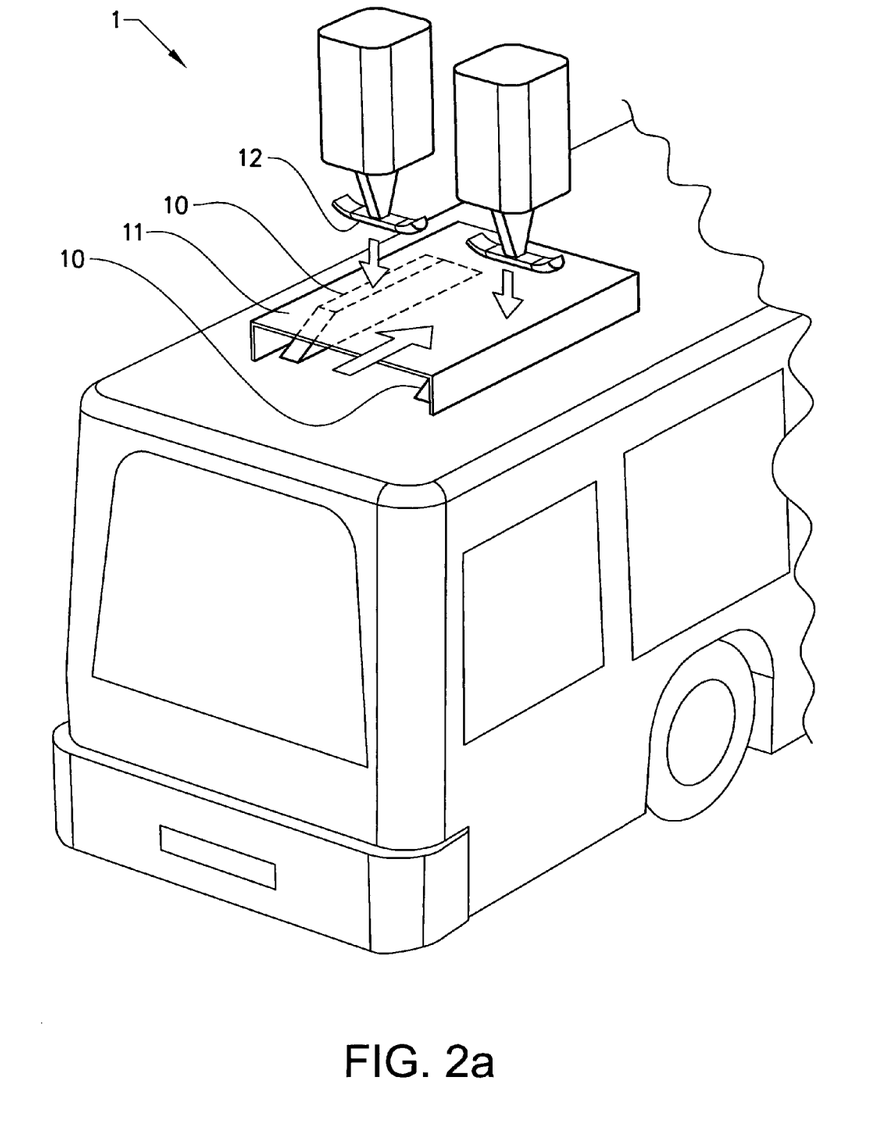
FIG. 2a shows a schematic second embodiment of a protection arrangement according to the invention in a closed state.
Figure 2B:
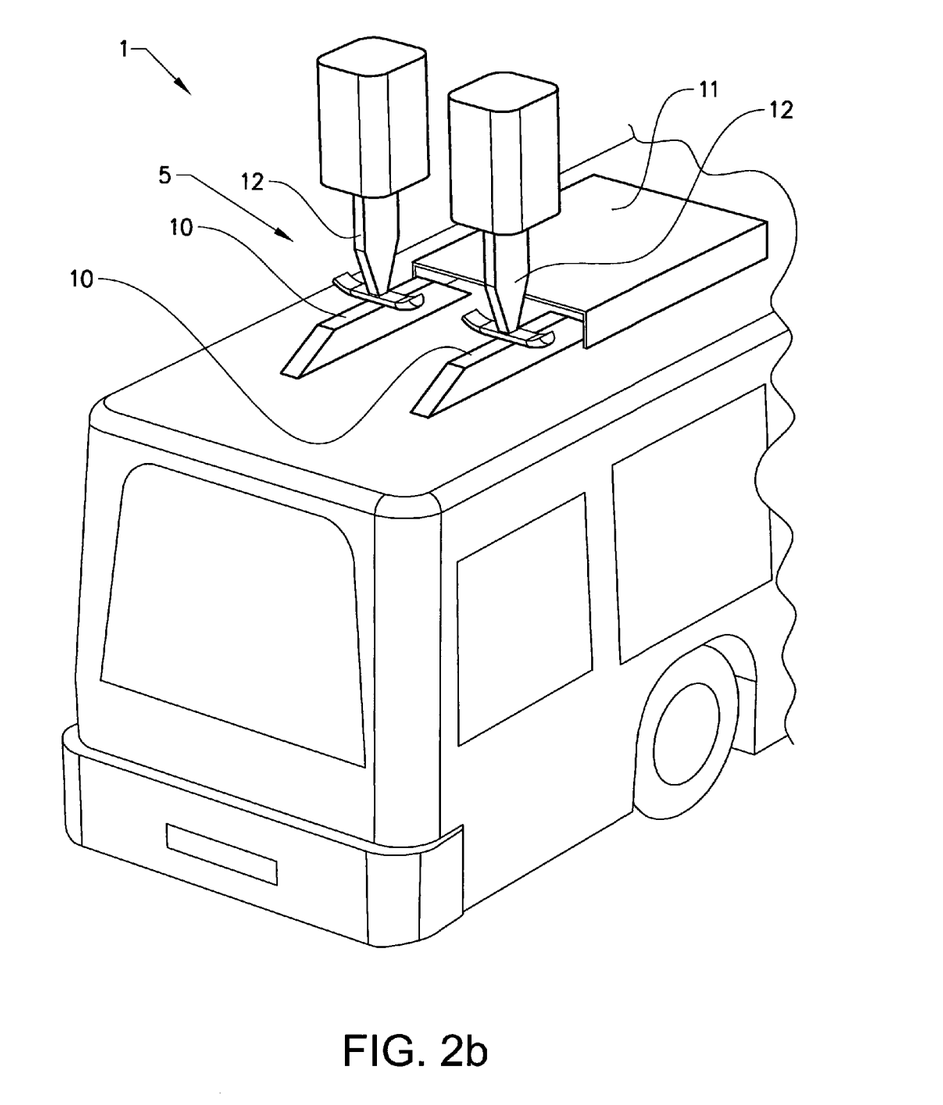
FIG. 2b shows a schematic second embodiment of a protection arrangement according to the invention in an open state.
Figure 3A:
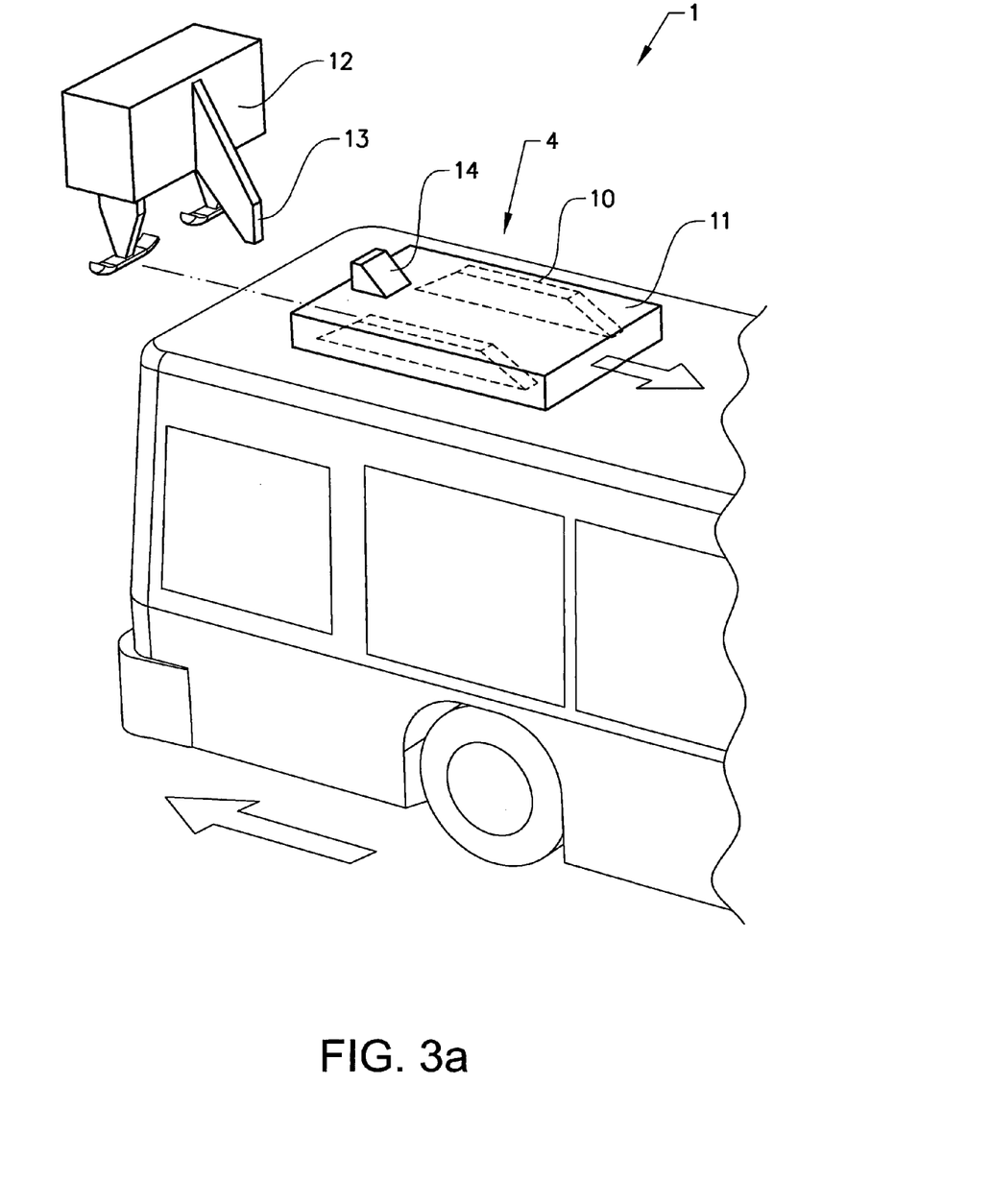
FIG. 3a shows a schematic development of the second embodiment of the protection arrangement according to the invention in a closed state.
Figure 3B:
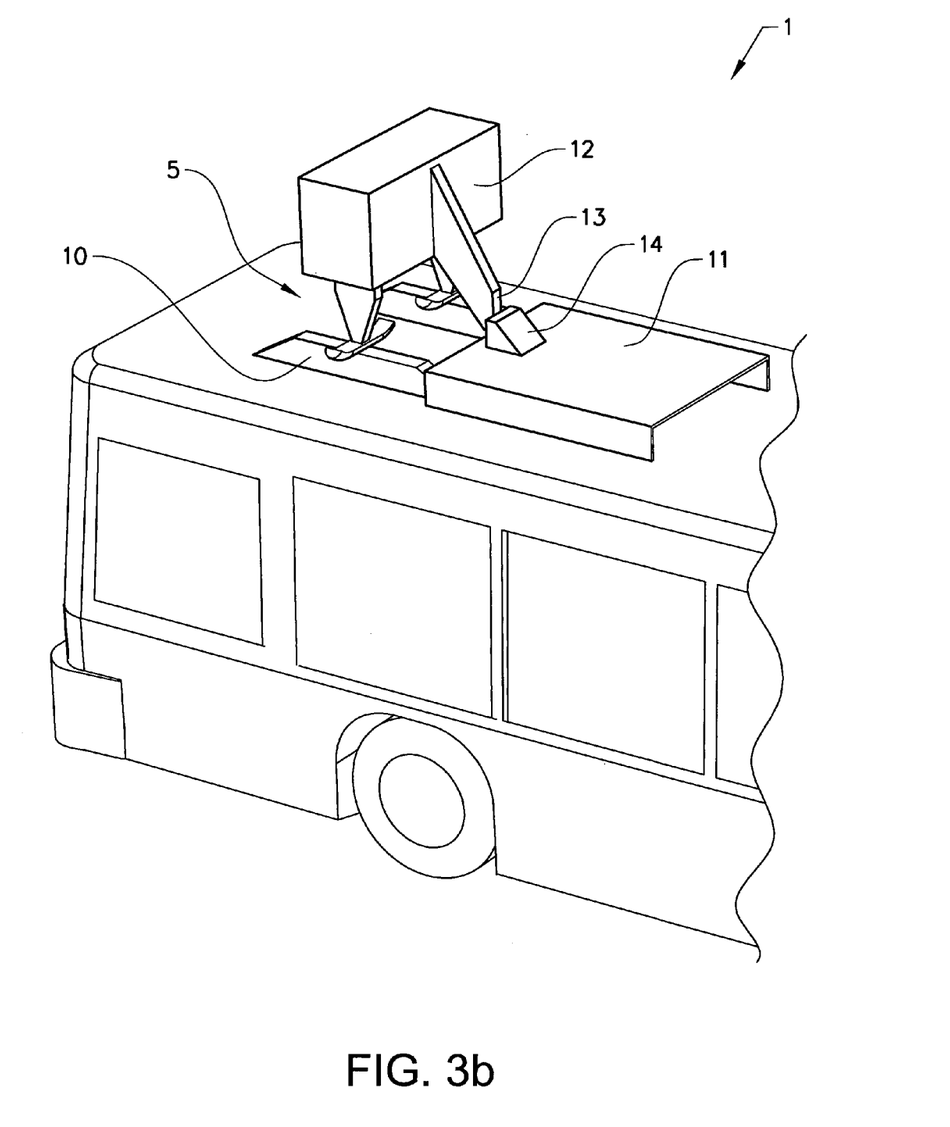
FIG. 3b shows the development of the second embodiment of a protection arrangement according to the invention in an open state.
Figure 4A:
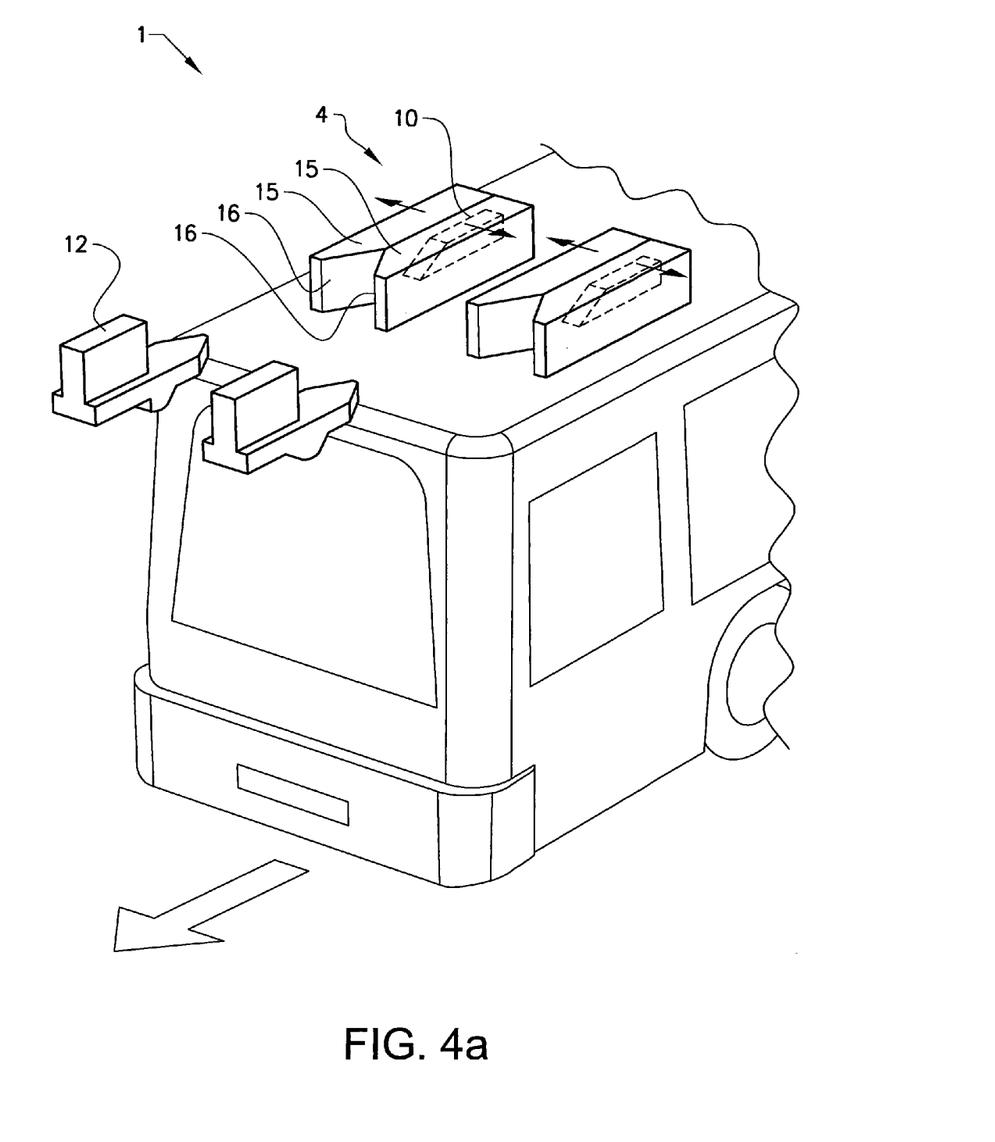
FIG. 4a shows a further schematic development of the second embodiment of the protection arrangement according to the invention.
Figure 4B:
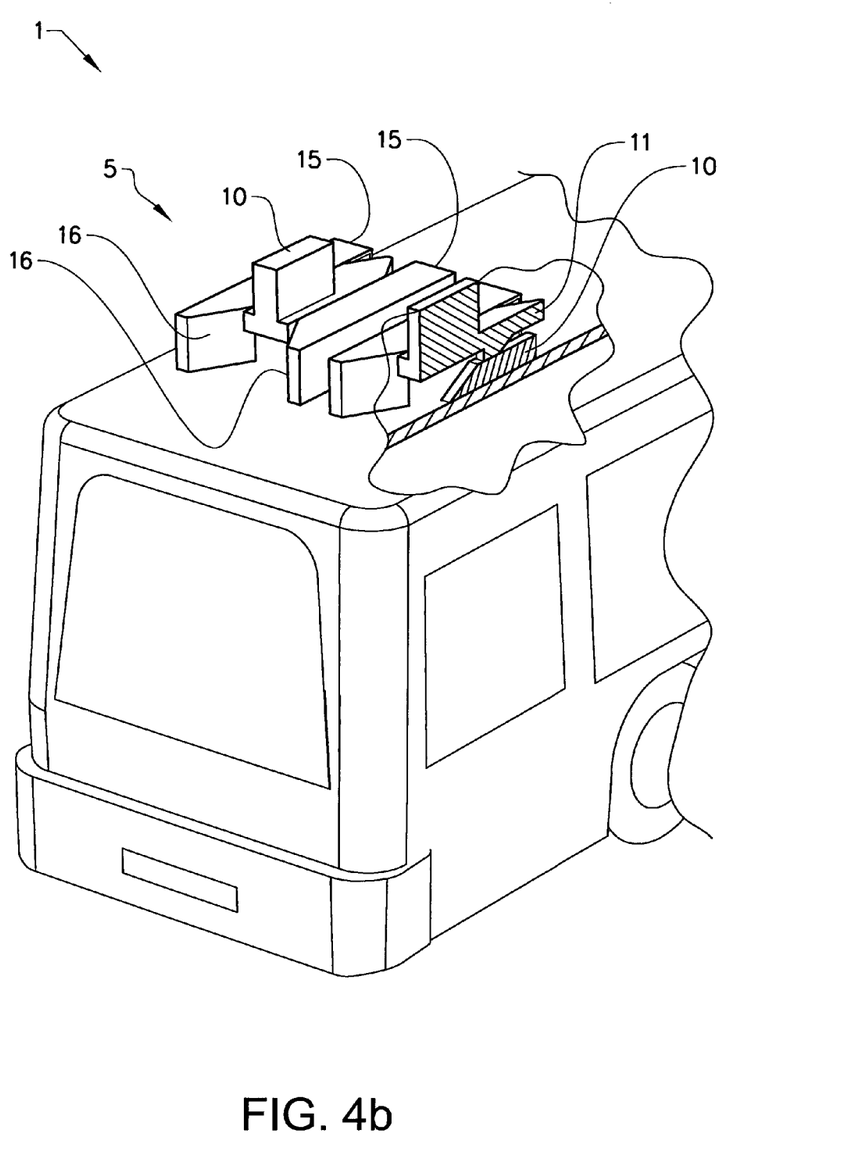
FIG. 4b shows the further development of the second embodiment of a protection arrangement according to the invention in an open state.

FIGS. 2 to 4 show a schematic second embodiment of a protection arrangement for a current collector according to the invention. In this embodiment, the current collector 10 is a fixed contact surface mounted on the roof of a vehicle and the protection arrangement 1 comprises a movable cover, in the first example a slideable cover 11. The contact surface is used to connect an external current source to a battery installed in the electric vehicle. The contact surface is preferably mounted on the roof of the vehicle, but it would also be possible to mount it under the vehicle. The contact surface is adapted to be contacted to a current supply means that will approach the contact surface when the vehicle is at the charging position at the charging station. The current supply means may be spring-loaded. The contact surface preferably extends somewhat from the roof of the vehicle.

The current supply means is mounted at the charging station. The current supply means may be a fixed means that is mounted in a position that automatically contacts the contact surface when the vehicle is driven to a predefined charging position. In such a case, the current supply means is preferably mounted in a resilient way such that a small variation in the positioning of the vehicle is adapted for. The current supply means may also be movable such that it moves to the charging position before or after the vehicle has entered the charging position at the charging station. When the vehicle is parked at the charging position, which may be a small area comprising a charging zone, the movable current supply means is moved to contact the contact surfaces. The exact positioning may be found using sensors.

Preferably, two contact surfaces are mounted side by side or after each other on the roof in order to provide two poles for the connection. It would also be possible to provide a return line, e.g. a ground connection, at a different location but two contact surfaces mounted on the roof simplifies the system and enables a safe charging of the battery. The contact surfaces may be mounted under the same protection arrangement using the same covers or each contact surface may have a separate cover.

FIG. 2a shows a closed slidable cover 11. The arrow indicates the sliding direction of the cover. This direction is towards the rear of the vehicle. The cover may be opened by a pushing means arranged at the charging station or it may be opened by an active means, such as an electric actuator or a compressed air valve which opens the cover when an opening signal is issued. The opening signal may be issued by the charging station when the vehicle is positioned close to or at the charging position. The opening signal may also be issued by the vehicle when a charging process is requested by the vehicle, e.g. when the batteries are below a specific energy level. The cover is preferably spring-loaded such that it closes when the current supply means is removed or when a catch is released by as closing signal. The catch may e.g. be an electric catch that releases when the power is disconnected, such that the cover also can close at a power failure. This improves the safety. FIG. 2b shows the slidable cover in an open state with the corresponding current supply means 12 contacting the current collectors 10.

FIG. 3a shows another example of a closed slidable cover 11. The arrow indicates the sliding direction of the cover. This direction is towards the rear of the vehicle. The cover 11 is in this example opened by a pushing means 13 which is arranged on the current supply means 12, e.g. being a charging bar with a resiliently suspended contact. The pushing means is adapted to interact with a protrusion 14 or other bearing surface on the cover, such that the cover is pushed open when the vehicle drives in to the charging station or when the movable current supply means is positioned at the charging position. At the same time, the resiliently suspended contact of the charging bar will contact the contact surface 10 of the vehicle. This is shown in FIG. 3b. When the battery or capacitor is charged enough and the charging should be aborted, the charging bar is released, e.g. by raising it upwards, and the pushing means 13 releases the cover which slides back to the closed state. The cover is preferably spring-loaded such that it closes automatically when the pushing means is removed.

FIG. 4a shows a further example of a closed cover 15. In this example, the cover 15 comprises two halves that are arranged to divide or slide sideways when the vehicle enters the charging station. The arrows indicate the opening direction of the cover. The cover 15 is in this example opened by a pushing means which may be arranged on the current supply means or on the charging station. It is also possible to open the covers by an opening signal that is issued when the vehicle approaches the charging position or when the vehicle is positioned at the charging position. Preferably, the pushing means is arranged on the current supply means, e.g.

a charging bar with a resiliently suspended contact. The pushing means will push against inclined surfaces 16 of the cover, which will part the two cover halves. The cover halves will either slide sideways or will rotate sideways such that an opening in the middle, between the cover halves, is created. The resiliently suspended contact will in this way be able to contact the contact surface and the battery or capacitor can be charged. This is shown in FIG. 4b. When the charging is completed, the charging bar may be raised such that the cover can close. The cover is preferably spring-loaded such that it closes automatically when the pushing means is removed. The cover will also close automatically if the vehicle drives forwards. In this way, the pushing means and the current supply means will leave the contact surface and the cover can close automatically. This example is suitable when the battery or capacitor is to be charged at every stop. It is also possible to close the covers with a closing signal that is issued when the charging is completed or when the vehicle leaves the charging position. The cover may also be a single cover which slides sideways to open in order to allow contact between the current collector and the current supply means.

Figure 5:
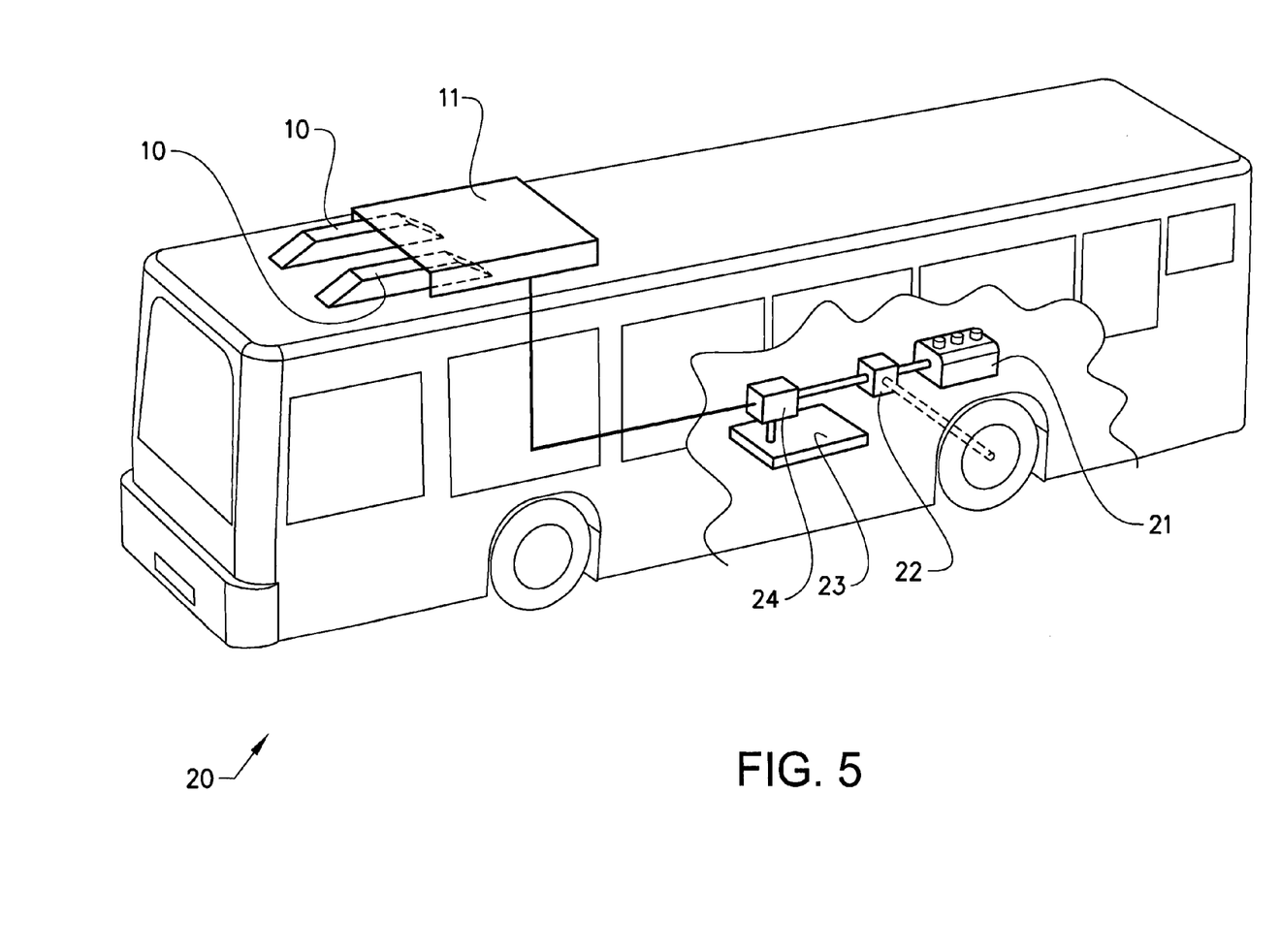
FIG. 5 shows a schematic electric vehicle according to the invention.

FIG. 5 shows a schematic electric vehicle 20 provided with two current supply means it the form of two contact surfaces 10. The electric vehicle is provided with an electric propulsion unit consisting of an electric machine 22 which can function both as a generator and as an electric motor. The electric machine is powered from an electric energy storage 23 which may be either a battery or a super capacitor. A control unit 24 controls the charging of the electric energy storage from the external power source through the contact surfaces 10. The control unit also controls the current fed to the electric machine from the energy storage when the electric machine is used as an electric motor and the current fed to the energy storage from the electric machine when the electric machine is used as a generator. The electric machine will function as a generator when the electric machine is used to recuperate energy when the vehicle brakes. The generator may also be driven by a combustion engine 21 when the vehicle is a plug-in hybrid vehicle. It is possible to use a central electric machine or to position one electric machine in two or more wheels of the vehicle. The electric vehicle is preferably a heavy vehicle such as a bus or a distribution truck, but also highway trucks may be provided with similar current collectors.

The invention is not to be regarded as being limited to the embodiments described above, a number of additional variants and modifications being possible within the scope of the subsequent claims.

REFERENCE SIGNS

1: Protection arrangement
2: Pivotable cover
3: Pantograph
4: Closed state
5: Open state
6: Conductor rail
10: Contact surface
11: Slidable cover
12: Current supply means
13: Pushing means
14: Bearing surface
15: Cover half
16: Inclined surface
20: Electric vehicle
21: Combustion engine
22: Electric machine 23: Electric energy storage
24: Control unit

The invention claimed is:

1. A protection arrangement tier a current collector arranged on a vehicle having an electric propulsion unit and a rechargeable energy storage, where the protection arrangement comprises a cover having a first protective state in which the current collector is covered by the cover and a second open state in which the protection arrangement allows contact between the current collector and a corresponding current supply means during charging of the energy storage, wherein the cover is automatically opened from the protective state to the open state when the vehicle has reached a predefined charging position; and wherein the cover is spring-loaded to automatically close the cover from the second open state to the first, protective state when a closing signal is issued.

2. The protection arrangement according to claim 1, wherein the transition to the open state is, initiated by a specific opening signal.

3. The protection arrangement according to claim 2, wherein the opening signal is issued when the vehicle reaches a predefined position.

4. The protection arrangement according to claim 1, wherein the opening signal is issued when the vehicle has stopped.

5. The protection arrangement according to claim 2, wherein the opening signal is issued when a request for charging is issued.

6. The protection arrangement according to claim 1, wherein closing signal is issued when the vehicle starts to move.

7. The protection arrangement according to claim 1, wherein closing signal is issued when the vehicle leaves the charging position.

8. The protection arrangement according to claim 1, wherein closing signal is issued when a person is in the vicinity of the current collector.

9. The protection arrangement according to claim 1, wherein the protection arrangement is arranged on the roof of the electric vehicle.

10. The protection arrangement according to claim 1, wherein the vehicle is a hybrid vehicle comprising a combustion engine.

11. The protection arrangement according to claim 1, wherein the rechargeable energy source is a battery or a super capacitor.

12. The protection arrangement according to claim 1, wherein the protection arrangement is a pivotable cover which opens upwards.

13. The protection arrangement according to claim 1, wherein the protection arrangement is a slidable cover which is arranged to slide parallel to the driving direction of the vehicle.

14. The protection arrangement according to claim 1, wherein the protection arrangement is a cover which is arranged to part sideways, perpendicular to the driving direction of the vehicle.

15. The protection arrangement according to claim 14, wherein the protection arrangement is a dividable cover.

16. The protection arrangement according to claim 1, wherein the protection arrangement is opened by an electric means or a compressed air means when the opening signal is issued.

17. The protection arrangement according to claim 1, wherein the protection arrangement is opened by a pushing means arranged on the current supply means.

18. An electric vehicle comprising a protection arrangement according to claim 1.

* * * * *